US008000877B2

(12) United States Patent
Aussillou

(10) Patent No.: US 8,000,877 B2
(45) Date of Patent: Aug. 16, 2011

(54) FUEL ECONOMY SYSTEM AND METHOD FOR A VEHICLE

(75) Inventor: Jean-François Aussillou, Montréal (CA)

(73) Assignees: Jean-François Aussilou, Montreal, Quebec (CA); Jean Toulin, Varennes, Quebec (CA); Mathieu Guerin, St-Sulpice. Quebec (CA); Rejean Turmel, St-Anges, Quebec (CA)

( * ) Notice: Subject to any disclaimer, the term of this patent is extended or adjusted under 35 U.S.C. 154(b) by 769 days.

(21) Appl. No.: 11/984,241

(22) Filed: Nov. 15, 2007

(65) Prior Publication Data

US 2008/0115764 A1 May 22, 2008

Related U.S. Application Data

(60) Provisional application No. 60/859,245, filed on Nov. 16, 2006.

(51) Int. Cl.
*G06F 19/00* (2011.01)
*F02D 11/10* (2006.01)
*B60W 10/04* (2006.01)

(52) U.S. Cl. ........ 701/103; 123/396; 123/399; 701/110; 702/182; 477/110

(58) Field of Classification Search .................. 123/319, 123/342, 349, 351, 361, 399, 396, 403; 701/93, 701/36, 54, 101–105, 110, 114, 115; 477/107, 477/110, 129, 131, 155; 180/69.3; 280/5.5; 702/182, 183; 73/114.52, 114.53
See application file for complete search history.

(56) References Cited

U.S. PATENT DOCUMENTS

| | | | | |
|---|---|---|---|---|
| 4,733,580 | A * | 3/1988 | Kubo et al. | 477/129 |
| 4,915,075 | A | 4/1990 | Brown | |
| 5,167,212 | A | 12/1992 | Peter et al. | |
| 5,774,820 | A | 6/1998 | Linden et al. | |
| 5,971,888 | A | 10/1999 | Goode | |
| 6,052,644 | A | 4/2000 | Murakami et al. | |
| 6,405,119 | B1 | 6/2002 | Linden | |
| 6,755,177 | B2 | 6/2004 | Woolford et al. | |
| 6,789,009 | B2 | 9/2004 | Schmitz et al. | |
| 6,795,764 | B2 | 9/2004 | Schmitz et al. | |
| 2006/0130603 | A1 | 6/2006 | Kato et al. | |

FOREIGN PATENT DOCUMENTS

JP 05221251 A1 8/1993

* cited by examiner

*Primary Examiner* — Willis R Wolfe, Jr.
(74) *Attorney, Agent, or Firm* — Equinox Protection; Franz Bonsang

(57) ABSTRACT

A fuel economy method and system consists of using a signal control unit connected to a throttle of a vehicle and to a mass sensor for sensing a mass of a load carried by the vehicle. When the sensor senses that the mass is within a predetermined mass range below a pre-determined load mass value, the signal control unit reduces the range of power output of the engine. The unmodified engine power output range and modified engine power output range extend from a minimum engine power output to, respectively, an unmodified maximum engine power output and to a modified maximum engine power output lower than the unmodified engine power output and thereby requiring less fuel. Accordingly, the range of engine power output, and notably the maximum engine power output available, is reduced when the mass is in the pre-determined mass range, thus reducing fuel consumption compared to the unmodified engine power output range.

20 Claims, 2 Drawing Sheets

FUEL ECONOMY SYSTEM AND METHOD FOR A VEHICLE

CROSS REFERENCE TO RELATED APPLICATIONS

Benefit of U.S. Provisional Application for Patent Ser. No. 60/859,245, filed on Nov. 16, 2006, is hereby claimed.

FIELD OF THE INVENTION

The present invention relates to a fuel economy system and method for a vehicle, and is more particularly concerned with a fuel economy system and method for a vehicle which regulate the power output of an engine of a vehicle, and thereby the fuel consumed thereby, based on a mass of a load carried by the vehicle.

BACKGROUND OF THE INVENTION

Systems and methods for limiting the power output of an engine, for fuel economy and other purposes are well known in the art. For example, U.S. Pat. No. 6,052,644, issued to Murakami et al. on Apr. 18, 2000 teaches an device and a method for limiting the vehicle speed in which the apparatus judges a vehicle speed limit traveling period when a vehicle speed signal is equal to or greater than a vehicle speed limit value, to calculate a corrected depressing stroke signal by a control gain based on a deviation value between the vehicle speed signal and the vehicle speed limit value so that the deviation value becomes smaller to output to an engine control device, and judges an accelerated traveling period, when the vehicle speed signal is smaller than the vehicle speed limit value and the corrected depressing stroke signal is larger than a depressing stroke signal, to output the depressing stroke signal to the engine control device. However, disadvantageously, such devices as that disclosed by Murakami only regulates the speed of the vehicle by taking into account the actual speed of the vehicle and correcting the speed of the motor only after the speed of the vehicle has surpassed or fallen below the vehicle speed limit value, and are thus not ideal for purposes of economizing fuel. Further, such devices do not take into account the mass of a load carried by the vehicle.

Japanese patent application publication number 05221251, filed on Feb. 12, 2002 by Komatsu Ltd. with Hattori Masaharu named as inventor, discloses another device for limiting the output of an engine, and thereby the speed, of a dump truck which obviates some of these disadvantages by taking into account the mass of a load carried by the dump truck using a pressure sensor. However, the system taught by Komatsu is above all conceived for preventing overloading of the dump truck and damage to a surface upon which the dump truck operates. Further, the device taught by Komatsu is complicated in that it requires connection to a multiplicity of components, including a transmission shifting device, rotational speed sensors for the motor, and to a pressure sensor.

Accordingly, an improved fuel economy system and method for a vehicle is required.

SUMMARY OF THE INVENTION

It is therefore a general object of the present invention to provide an improved fuel economy system and method that limits the power output of an engine of a vehicle based on the mass of a load carried by the vehicle.

An advantage of the present invention is that the fuel economy system and method provided thereby does not require modification of the engine control unit of the vehicle.

Another advantage of the present invention is that the fuel economy system and method provided thereby provides fuel economy transparently and automatically based on the mass of the load carried by the vehicle without express intervention or knowledge of the driver of the vehicle so as to significantly reduce the effect of bad drivers on fuel consumption.

According to a first aspect of the present invention, there is provided a fuel economy system connectable to a throttling means of a vehicle and to an engine control unit connected to an engine of the vehicle, the throttling means generating an unmodified throttling signal having a throttling signal voltage in an unmodified throttling signal voltage range between a minimum throttling signal voltage and an unmodified maximum throttling signal voltage in response to a throttling input between a minimum throttling input and a maximum throttling input received by the throttling means, the engine control unit increasing and decreasing an engine power, output of the engine, and thereby an amount of fuel consumed thereby, as the throttling signal voltage and throttling input both respectively increase and decrease, the system comprises:

- a sensor for sensing a mass of a load carried by the vehicle; and
- a signal control unit connected to the sensor and connectable to the throttling means and the engine control unit, the signal control unit, when the mass sensed by the sensor is within a pre-determined mass range below a pre-determined load mass value, reducing a range of the engine power output for the throttling input from an unmodified engine power output range having a minimum engine power output corresponding to the minimum throttling input and an unmodified maximum engine power output corresponding to the maximum throttling input to a modified engine power output range between the minimum engine power output and a modified engine power output corresponding to the maximum throttling input and below the unmodified throttling input, thereby gradually reducing the engine power output, compared to the unmodified engine power output, for the throttling input and the amount of fuel consumed when the mass is in the pre-determined mass range.

In another aspect of the present invention, there is provided a fuel economy method for a vehicle having a throttling means and an engine control unit connected to an engine of the vehicle, the throttling means generating an unmodified throttling signal having a throttling signal voltage in an unmodified throttling signal voltage range between a minimum throttling signal voltage and an unmodified maximum throttling signal voltage in response to a throttling input between a minimum throttling input and a maximum throttling input received by the throttling means, the engine control unit increasing and decreasing an engine power, output of the engine, and thereby an amount of fuel consumed thereby, as the throttling signal voltage and throttling input both respectively increase and decrease, the method comprises the steps of:

a) sensing whether the mass of a load carried by the vehicle is within a pre-determined mass range; and b) when the mass of the load is within the pre-determined mass range below a pre-determined load mass value, reducing a range of the engine power output for the throttling input from an unmodified engine power output range having a minimum engine power output corresponding to the minimum throttling input and an unmodified maximum engine power output corresponding to the maximum throttling input to a modified engine power output range between the minimum engine power output and a modified engine power output corresponding to the maximum throttling input and below the unmodified throttling input, thereby gradually reducing the engine power, output and the fuel consumed, compared to the unmodified engine power, output and fuel consumed, as the throttling input approaches the maximum throttling input when the mass is in the pre-determined mass range.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figure, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
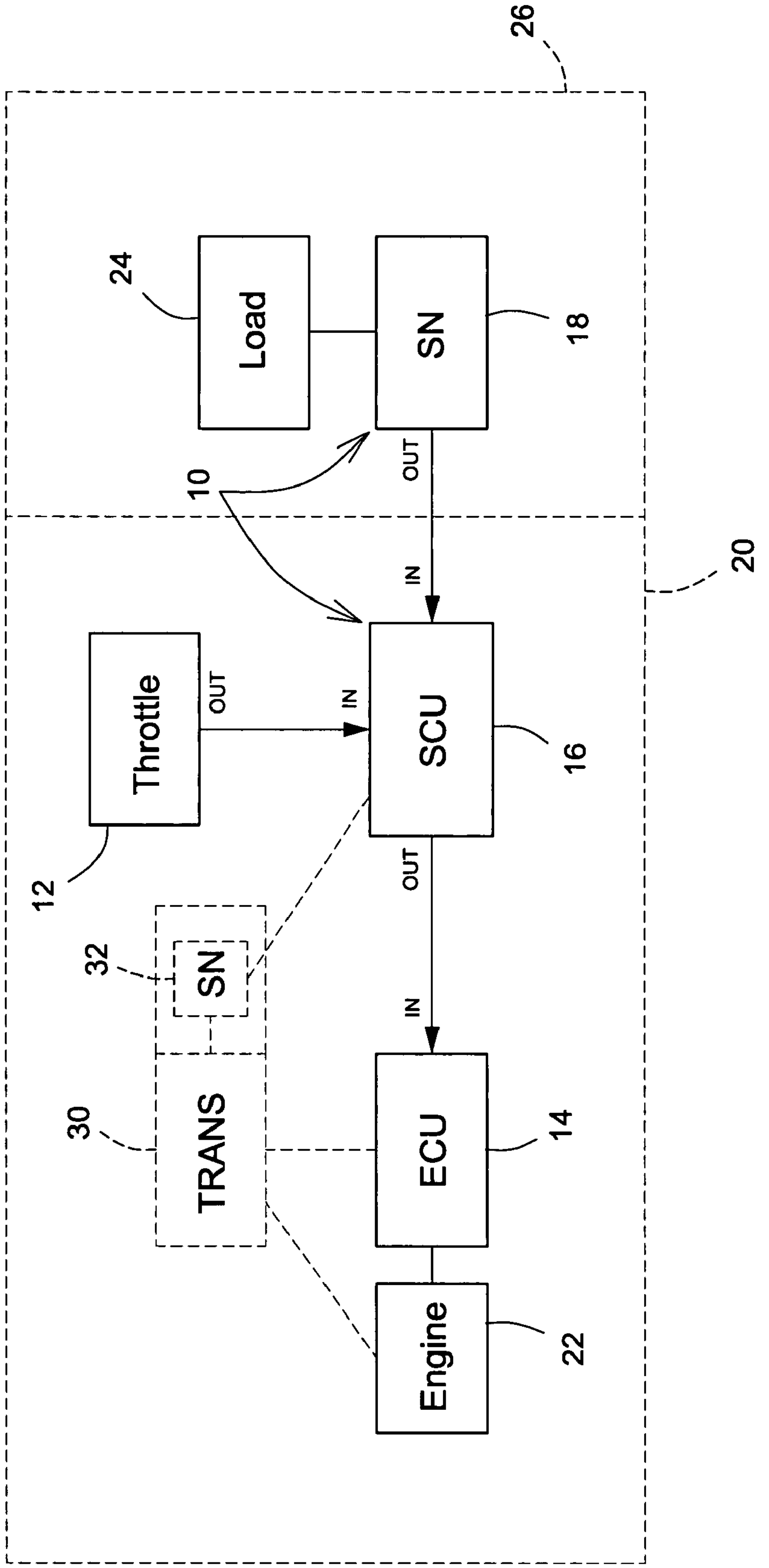
FIG. 1 is a schematic view of a fuel economy system in accordance with an embodiment of the invention connected to a throttling means and engine control unit of a vehicle.
Figure 2:
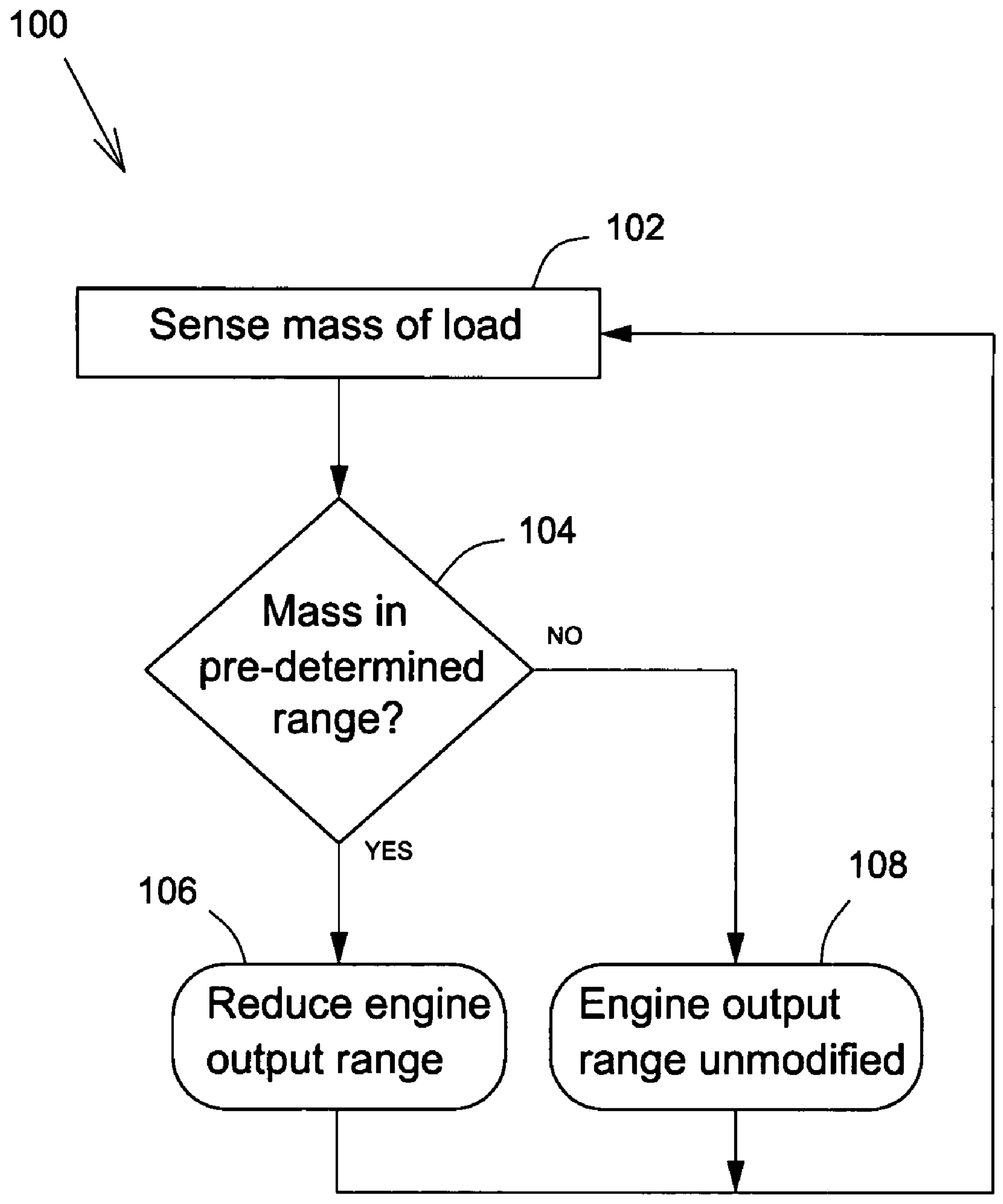
FIG. 2 is a flow chart of a fuel economy method in accordance with an embodiment of the invention connected to a throttling means and engine control unit of a vehicle.

Reference is now made to FIGS. 1 and 2. FIG. 1 shows a schematic view of a fuel economy system, shown generally as 10, in accordance with an embodiment of the invention connected to a throttling means 12 and engine control unit (ECU) 14 of a vehicle 20. FIG. 2 shows a fuel economy method, shown generally as 100, in accordance with an embodiment of the invention and which is deployed with the system shown in FIG. 1.

The system 10 consists of a signal control unit (SCU) 16 and at least one sensor (SN) 18 to which the SCU 16 is connected. The SN 18 is connected to the vehicle or to a trailer 26 connected to the vehicle and senses, i.e. measures or determines, the mass of a load 24 carried by the vehicle 20 or on the trailer 26 connected thereto at step 102 of method 100. The SN 18 transmits the mass of the load 24 determined thereby, as a mass signal, to the SCU 16, which determines, at step 104, whether the mass of the load 24 is within one or more pre-determined mass ranges, below a pre-determined load mass value. such as the manufacturer maximum rated load mass value for the vehicle. Alternatively, the SN 18 may simply transmit a mass signal to the SCU 18 indicating whether the mass of the load 24 is within one or more pre-determined mass ranges, in which case steps 102 and 104 of method 100 are combined.

The SCU 16 is, in turn, connectable to the, typically pre-existing, throttling means 12 on the vehicle 20 and the ECU 14, generally also pre-existing, of the vehicle 20. The throttling means 12 typically has a throttling input mechanism, such as pedal or the like, operated by the driver of the vehicle 20 and by which the throttling means receives a throttling input within a throttling input range defined by a minimum throttling Input and a maximum throttling input. In response to the throttling input, the throttling means generates an unmodified throttling signal having a throttling signal voltage which increases and decreases within an unmodified throttling signal range defined by a minimum, and possibly null, throttling signal voltage and an unmodified maximum throttling signal voltage in response to, respectively, increases and decreases in the throttling input within the throttling input range. When the system 10 is not deployed or installed in the vehicle 20, in which case the ECU 14 is typically directly connected to the throttling means 12, or when the mass of the load 24 detected by the SN 18 is determined at step 104 to be outside, and typically above, the pro-determined mass range, that is above the pre-determined load mass value, the ECU 14 receives the throttling signal, at step 108, as an unmodified throttling signal from the throttling means 12. The ECU 14, in response to the unmodified throttling signal, increases and decreases the engine power output (referred to as engine output hereinafter) of engine 22 within an unmodified engine output range defined by a minimum, or possibly null, engine output and an unmodified maximum engine output as the throttling signal voltage respectively increases and decreases, within the unmodified throttling signal range. Accordingly, the minimum engine output corresponds to the minimum throttling signal which corresponds to the minimum throttling input. Similarly, the unmodified maximum engine output corresponds to the unmodified maximum throttling signal which corresponds to the maximum throttling input. As is well known in the art, the amount of fuel consumed by the vehicle increases and decreases as the output of the engine 22 respectively increases and decreases. For the purposes of this description, the engine output of the engine 22 may be considered to be the number of revolutions thereof in a given period of time.

To install the system 10, the SN 18 is connected to the vehicle 20, or the trailer 26 connected to the vehicle 20, and to the SCU 16. The SCU 16 is, in turn, connected to the output of throttling means 12 and to the input of the ECU 14 to which the output of the throttling means 12 would be connected if the system 10 were not installed. Accordingly, when the system 10 is installed, the SCU 16 receives the unmodified throttling signal from the throttling means 12 and provides the input to the ECU 14, i.e. the throttling signal, based upon which the ECU 14 controls the engine output, which in turn determines the amount of fuel consumed thereby.

When the system 10 is installed and actuated, the SN 18 constantly senses and determines the mass of the load 24 carried by the vehicle 20 and transmits a mass signal to the SCU 18 as described above for steps 102 and 104. If the mass sensed by the SN 18 is determined at step 104 to be within a pre-determined mass range below the pre-determined load mass value, the SCU 16 limits, i.e. reduces, the range of the engine output from the unmodified engine output range to a modified engine output range at step 106. To restrict the range to the modified engine output range at step 108, the SCU 16 preferably modifies, i.e. translates or maps, the throttling signal voltage of the unmodified throttling signal received from the throttling means 12 into a modified throttling signal using a pre-determined algorithm programmed into the SCU 16. The modified throttling signal has a modified throttling signal voltage in a modified throttling signal range between the minimum throttling signal voltage and a modified maximum throttling signal voltage which is lower than the unmodified maximum throttling signal voltage and is transmitted by the SCU 16 to the ECU 14. Thus, when the mass sensed by the SN 18 is within the pre-determined mass range, determined at steps 102 and 104, the ECU 14, at step 106, receives the modified throttling signal from the SCU 16, which increases and decreases within the modified throttling signal range between the minimum throttling signal voltage and the modified maximum signal voltage as the throttling input respectively increases and decreases within the throttling input range. Accordingly, while the mass sensed by the SN 18 is within the pre-determined mass range, the minimum throttling signal voltage received by the ECU 14 from SCU 16 when the throttling input is at the throttling input minimum remains the same at step 106 as when the SN 18 is not within the pre-determined mass range for step 108. However, the throttling signal received by the ECU 14 when the throttling input is at the maximum throttling input during step 106 is modified, i.e. decreased, from the unmodified maximum throttling signal voltage to the modified maximum throttling signal voltage. Accordingly, when the mass sensed by the SN 18 is within the pre-determined mass range, the maximum engine output is decreased at step 106 from the unmodified maximum engine output to a decreased modified maximum engine output, requiring less fuel, when the throttling input is at the maximum throttling input and as throttling input approaches the maximum throttling input, as compared when to the mass sensed by the SN 18 is not within the pre-determined mass range, i.e. during step 108. Thus, at step 106, when the mass of the load 24 sensed by the SN 18 is within the pre-determined mass range, as determined at steps 102 and 104, the range of the throttling signal received by the ECU 14 is reduced from the unmodified throttling signal voltage range received by the ECU 14, and used in step 108, to the modified throttling signal voltage range received from the SCU 16 by the ECU 14, which reduces the engine output range from the unmodified engine output range, used in step 108, to the modified engine output range, whereas the throttling input range remains the same. Accordingly, if, at step 104, the mass sensed by the SN 18 is within the pre-determined mass range, the engine output range of the engine 22 is automatically and transparently reduced at step 106 for the same throttle input range, without requiring any intervention by the driver of the vehicle. The reduced modified engine output range of the engine 22 used at step 106 reduces, for a given period of time while the mass is in the predetermined mass range, the amount of fuel consumed by the engine 22, compared to the unmodified output range used in step 108, as the throttle input approaches the maximum throttle input as the output of the engine 22 is lowered compared to the unmodified output range. As the mass of the load 24 is constantly sensed by SN 24 at step 102 and measured against the predetermined mass range at step 104, once the SCU 16 selects the modified engine output range at step 106 or unmodified engine output range at step 108, the method 100 automatically returns to step 102 and repeats.

The mass range and modified throttling signal voltage range are generally pre-configured, i.e. programmed into the system 10 with a pre-determined algorithm, such that the corresponding modified maximum engine output for the modified maximum throttling signal voltage used in step 106, while reduced compared to the unmodified maximum engine output, is sufficient to carry the mass of the load 24 In the pre-determined mass range while still allowing the vehicle to move at a predetermined, and commonly accepted, maximum speed, for example between 80 and 110 km/h (kilometers per hour) or 55 to 70 mph (miles per hour). The pre-determined algorithm applied at step 106 and by which the unmodified throttling signal is modified into the modified throttling signal may be any algorithm or function by which the voltages in the unmodified throttling signal range may be mapped into voltages in the modified throttling signal range. However, preferably the algorithm will generally generate a modified throttling signal voltage that approximates the line or curb of voltage for the unmodified throttling signal voltage in response to the throttling input. However, the voltage of the modified throttling signal voltage generated by application of the pre-determined algorithm by the SCU 16 is, preferably, gradually decreased compared to the unmodified throttling signal voltage as the throttling input increases from the throttling input minimum towards the throttling input maximum. In other words, when the mass is in the predetermined mass range, the difference, or gap, between the unmodified throttling signal voltage and the modified throttling signal voltage will increase as the throttling input increases from the minimum throttling input towards the maximum throttling input as the throttling input increases.

Typically, and referring to steps 106 and 108, the unmodified throttle signal voltage range generated by the throttling means 12 is between the minimum throttle signal voltage of 0 Vdc (volts, direct current) and an unmodified maximum throttling voltage of 5 Vdc. When the mass of the load 24 is within the pre-determined mass range, as determined at steps 102 and 104, the SCU 16, ideally, reduces the unmodified throttle signal voltage range of 0 to 5 Vdc to a modified throttle signal voltage range between the minimum throttle signal voltage of 0 Vdc and a modified maximum throttle signal voltage of 3.5 Vdc at step 108. However, the system 10 may be configured for other minimum and, both modified and unmodified, maximum throttling signal voltage values. Further, the system 10 may be configured such that there is more than one pre-determined mass range, each predetermined mass range having a corresponding modified maximum throttle signal voltage and modified throttle signal voltage range and corresponding modified engine output range and corresponding modified maximum engine output. For example, if the mass of the load 24 is within a first predetermined mass range of 0 and 2000 kg (or 4400 lbs), then the SCU 16 could reduce the unmodified throttle signal voltage range of 0 to 5 Vdc to a modified throttle signal voltage range between the minimum throttle signal voltage of 0 Vdc and a modified maximum throttle signal voltage of 0 to 3.5 Vdc, reducing the engine output range accordingly. If the mass of the load 24 is in a second pre-determined mass range between 2001 and 4000 kg (4401 and 8800 lbs)), then the SCU 16 could reduce the unmodified throttle signal voltage range of 0 to 5 Vdc to a modified throttle signal voltage range between the mininium throttle signal voltage of 0 Vdc and a modified maximum throttle signal voltage of 0 to 4 Vdc, which would again reduce the engine output range accordingly, but provide a greater modified maximum engine output than for the first pre-determined mass range so that more power will be available to carry the additional mass of the load 24. If the mass of the load 24 is above 4000 kg (8800 lbs), as the ore-determined load mass value, then the SCU 16 could leave the throttle signal voltage range unmodified, thus leaving the engine output range unmodified to provide the full, unmodified, power output of the engine 22 to carry the load 24.

The vehicle 20 is, typically, a truck having a trailer 26 connected thereto and upon which the load 24 is carried, the SN 18 being connected to the trailer 26 for sensing the mass of the load 24 carried thereon. However, the vehicle 20 could also be an automobile, tractor, or any other motorized vehicle which carries a load 24. Further, the load 24 need not be carried on a trailer 26 attached to the vehicle 20, and can be carried directly on the vehicle 20, in which case the SN 18 is also connected directly to the vehicle and is configured to detect the difference between the vehicles mass without a load 24 and the mass with a load 24. The SN 18 may be any type of sensor or device capable of sensing or otherwise determining the mass of the load 24. For example, the SN 18 could be a mass sensor disposed under the load 24 for sensing and measuring the mass thereof at step 102. The SN 18 could also, for example, be a pressure sensor connected to the wheels underneath the load 24 and upon which the load is carried. More specifically, the SN 18 could be a pressure sensor 18 which measures the pressure or deformation caused by the load 24 inside the tires for the wheels upon which the load 24 is carried and which determines, for example by calculation, the mass of the load 24 at step 102 based upon the pressure or deformation measured thereby. Similarly, the SN 18 could be a pressure sensor connected to the suspension upon which the load 24 is carried, in which case the SN 18 could measure the deformation of the suspension caused by the load 24 to determine, for example by calculation, the mass of the load at step 102 based on the deformation measured thereby. The SN 18 could also be a sensor, such as a velocity sensor or acceleration sensor, or other mechanism which determines, for example by calculation, the mass of the load 24 at step 102 by measuring linear acceleration of the vehicle 20, and specifically the effect of the mass of the load 24 on the linear acceleration. Alternatively, the SN 18 could be a sensor, such as a velocity sensor or acceleration sensor, for measuring angular acceleration of a driveline component of the vehicle and which determines the mass of the load 24 at step 102 by measuring the effect of the mass on the angular acceleration and calculating the mass based on the effect measured. Such driveline components could include, for example, the wheels, differential(s), hubs, as well as and any interconnecting shafts, of the vehicle 20.

The throttling means 12 typically has a conventional accelerator pedal, as the throttling input device, and a transducer connected thereto, the throttling input being provided, and generally increased, by depression of the accelerator pedal and converted into the throttling signal by the transducer. Thus, the throttling signal voltage of the throttling signal is generally increased and decreased as the level of depression of the accelerator pedal respectively increases and decreases. However, the throttling means 12 may also be a gear shift, an accelerator lever connected to a transducer, or any other apparatus by which a throttling input is provided by the driver of a vehicle for controlling the output of the engine 22 thereof and for which an electronic throttling signal is generated in response to the throttling input.

Optionally, the SCU 16 may also be connected to a transmission 30 of the vehicle 20, the transmission being connected to the engine 22 and the ECU 14 and having a, preferably electronic, switch (SW) 32 connected thereto for selecting between at least two shift schedules which control access to use of uppermost gears when driving the vehicle 20. Typically, such schedules include an unrestricted first shift schedule, in which the engine 22 may be shifted without restriction, manually or automatically, into the uppermost gears which deliver the most engine output, up to the unmodified maximum engine output, for the vehicle 20, and at least one additional restricted shift schedule in which the engine 22 may not be shifted into the uppermost gears or in which shifting the engine 22 into the uppermost gears is restricted. In other words, the engine output range for the unrestricted modified engine output is the unmodified engine output range extending from the minimum engine output and the unmodified maximum engine output. Conversely, for the restricted shift schedule, the engine output is reduced to the modified engine output range extending from the minimum engine output to the modified maximum engine output. As the engine output is generally reduced in the restricted shift schedules, the amount of fuel is also reduced.

Typically, when the system 10 is not installed or actuated, the driver selects the shift schedule by selecting a corresponding setting on the switch 32. However, when the system 10 is installed on a vehicle 20 having a transmission 30 having such selectable shift schedules, the SCU 16 automatically places, at step 106, the transmission 30, engine 22 and ECU 14, in the restricted shift schedule, by selection thereof, when the mass detected by the SN 18 is within the corresponding pre-determined mass range, as determined at steps 102 and 104, for which the full engine output is not required and which corresponds to the restricted shift schedule. Thus, when the mass detected by the SN 18 is determined at step 104 to be within the pre-determined mass range, shifting to the uppermost gears is either automatically prevented or restricted by the SCU 16, thus limiting the engine output to the modified engine output range and reducing the fuel consumed, without the driver having to manually select the shift schedule using the switch 32 or other intervention thereby. Similarly, the SCU 16 may automatically switch, i.e. select, the engine 22 and transmission 30, and switch 32 now connected to the SCU 16, to the unrestricted shift schedule when the mass detected by the SN 18 is sufficiently elevated above the pre-determined load mass value that the unmodified maximum engine output is required, i.e. outside the predetermined mass range, as determined at steps 102 and 104. Typically, the SCU 16 selects the restricted shift schedule and unrestricted shift schedule by actuating, i.e. triggering, the switch 32, typically be transmitting a signal thereto causing the switch to switch the transmission 30, engine 22, and ECU 14 between the restricted shift schedule and unrestricted shift schedule. It should be noted that the automatic switching of the shifting schedules by the SCU 16 may be deployed either separately or in conjunction with adjustments to the throttling signal voltage by the SCU 16, as described above.

Although the fuel economy system 10 and method 100 provided by the present invention have been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A fuel economy system connectable to a throttling means of a vehicle and to an engine control unit connected to an engine of the vehicle, the throttling means generating an unmodified throttling signal having a throttling signal voltage in an unmodified throttling signal voltage range between a minimum throttling signal voltage and an unmodified maximum throttling signal voltage in response to a throttling input between a minimum throttling input and a maximum throttling input received by the throttling means, the engine control unit increasing and decreasing an engine power output of the engine, and thereby an amount of fuel consumed thereby, as the throttling signal voltage and throttling input both respectively increase and decrease, the system comprising:

a sensor for sensing a mass of a load carried by the vehicle; and a signal control unit connected to said sensor and connectable to said throttling means and said engine control unit, said signal control unit, when said mass sensed by said sensor is within a pre-determined mass range below a pre-determined load mass value, reducing a range of said engine power output for said throttling input from an unmodified engine power output range having a minimum engine power output corresponding to said minimum throttling input and an unmodified maximum engine power output corresponding to said maximum throttling input to a modified engine power output range between said minimum engine power output and a modified engine power output corresponding to said maximum throttling input and below said unmodified throttling input, thereby gradually reducing said engine power output, compared to said unmodified engine power output, for said throttling input and the amount of fuel consumed when said mass is in said pre-determined mass range.

2. The system of claim 1, wherein, when said mass sensed is within said pre-determined mass range, said signal control unit converts the unmodified throttling signal into a modified throttling signal having a modified throttling signal voltage in a modified throttling signal voltage range between the minimum throttling signal voltage corresponding to the minimum throttling input and a modified maximum throttling signal voltage corresponding to the maximum throttling input and modified maximum engine power output and lower than said unmodified maximum throttling signal voltage corresponding to said unmodified maximum engine power output, thereby limiting the engine power output of the engine to the modified engine power output.

3. The system of claim 1, wherein said sensor is a sensor disposed under the load and configured for detecting the mass thereof.

4. The system of claim 1, wherein said sensor is a pressure sensor connected to a suspension disposed underneath the load and upon which the load is carried, the mass being determined by the pressure sensor by measuring a deformation of said suspension caused by pressure of the mass upon said suspension.

5. The system of claim 1, wherein said sensor is a pressure sensor connected to at least one tire disposed underneath the load and upon which the load is carried, the sensor determining the mass by measuring pressure within the tire and exerted thereupon by the mass.

6. The system of claim 1, wherein said sensor senses a linear acceleration of the vehicle and determines the mass based on an effect of the mass on said linear acceleration.

7. The system of claim 1, wherein said sensor senses an angular acceleration of at least one driveline component of the vehicle and determines the mass based upon an effect of the mass on said angular acceleration.

8. The system of claim 1, wherein, for the unmodified throttle signal voltage range and said modified signal voltage range, the minimum throttle signal voltage is about 0 volt of direct current, the unmodified maximum throttling voltage for the unmodified throttle signal voltage range is about 5 volts of direct current, and, for said modified throttle signal voltage range, said modified maximum throttle signal voltage is about 3.5 volts of direct current,

9. The system of claim 1, wherein said modified maximum throttling signal is configured, for when said mass is within said predetermined mass range, to be sufficient to cause said engine control unit to allow a modified maximum engine power output sufficient top carry said mass in said range between speeds of about 55 mph and about 70 mph.

10. The system of claim 1, wherein said signal control unit is further connectable to a transmission of the vehicle, said transmission being connected to the engine control unit and the engine and providing an unrestricted shift schedule of gears for the engine, in which the engine may be shifted into uppermost gears in which said maximum engine power output is accessible, thereby providing access to said unmodified engine power output range, and a restricted shift schedule in which shifting of the engine into the uppermost gears is restricted and the engine power output is limited to said modified engine power output range, said signal control unit automatically selecting said restricted shift schedule when the mass detected by the sensor is within a said pre-determined mass range and automatically selecting said unrestricted shift schedule when the mass detected by said sensor is outside said pre-determined mass range.

11. The system of claim 10, wherein said transmission has a switch for selecting between said restricted shift schedule and said unrestricted shift schedule, said signal control unit being connectable to said switch for connecting said signal control unit to said transmission, said signal control unit selecting between said restricted shift schedule and said unrestricted shift schedule with said switch.

12. The system of claim 11, wherein said signal control unit transmits a signal to said switch for actuating said switch to select between said restricted shift schedule and said unrestricted shift schedule.

13. A fuel economy method for a vehicle having a throttling means and an engine control unit connected to an engine of the vehicle, the throttling means generating an unmodified throttling signal having a throttling signal voltage in an unmodified throttling signal voltage range between a minimum throttling signal voltage and an unmodified maximum throttling signal voltage in response to a throttling input between a minimum throttling input and a maximum throttling input received by the throttling means, the engine control unit increasing and decreasing an engine power output of the engine, and thereby an amount of fuel consumed thereby, as the throttling signal voltage and throttling input both respectively increase and decrease, the method comprising the steps of:

a) sensing whether the mass of a load carried by the vehicle is within a pre-determined mass range; and b) when the mass of the load is within the pre-determined mass range below a pre-determined load mass value, reducing a range of said engine power output for said throttling input from an unmodified engine power output range having a minimum engine power output corresponding to said minimum throttling input and an unmodified maximum engine power output corresponding to said maximum throttling input to a modified engine power output range between said minimum engine power output and a modified engine power output corresponding to said maximum throttling input and below said unmodified throttling input, thereby gradually reducing said engine power output and said fuel consumed, compared to said unmodified engine power output and fuel consumed, as said throttling input approaches said maximum throttling input when said mass is in said pre-determined mass range.

14. The method of claim 13, wherein said signal control unit is further connectable to a transmission of the vehicle, said transmission being connected to the engine control unit and the engine and providing an unrestricted shift schedule of gears, in which the engine may be shifted into uppermost gears in which said maximum engine power output is accessible, thereby providing access to said unmodified engine power output range, and a restricted shift schedule in which shifting of the engine into the uppermost gears is restricted and the engine power output is limited to said modified engine power output range, and step b) comprises the step of e) when the mass detected by the sensor is within said pre-determined mass range, automatically selecting said restricted shift schedule.

15. The method of claim 13, wherein step a) comprises the steps of:

f) measuring a deformation caused by a pressure exerted by the mass on a suspension upon which the load is carried; and g) based on said deformation, determining said mass.

16. The method of claim 13, wherein said step a) comprises the steps of:

h) measuring a pressure exerted by the mass on at least one tire upon which the mass is carried; and i) based on said pressure, determining said mass.

17. The method of claim 13, wherein said step a) comprises the steps of:

j) measuring a linear acceleration of the vehicle; and k) determining said mass based on an effect of said mass on said linear acceleration.

18. The method of claim 13, wherein said step a) comprises the steps of:

l) measuring an angular acceleration of at least one driveline component of the vehicle; and m) determining said mass based on an effect of said mass on said, angular acceleration.

19. The method of claim 13, wherein step b) comprises the steps of:

c) when the mass of the load is within the pre-determined mass range, converting the unmodified throttling signal into a modified throttling signal having a modified throttling signal voltage in a modified throttling signal voltage range between the minimum voltage and a modified maximum throttling signal voltage lower than the unmodified maximum throttling signal voltage; and d) transmitting the modified throttle signal to the engine control unit, thereby progressively lowering the engine power output, and thereby fuel consumed, in response to the throttling input with the modified throttling signal compared to the engine power output generated in response to the unmodified throttling signal as the throttling input increases towards the maximum throttling input.

20. The method of claim 19, wherein, for the unmodified throttle signal voltage range and said modified signal voltage range, the minimum throttle signal voltage is about 0 volts of direct current, the unmodified maximum throttling voltage for the unmodified throttle signal voltage range is about 5 volts of direct current, and, for said modified throttle signal voltage range, said modified maximum throttle signal voltage is about 3.5 volts of direct current.

* * * * *